(12) United States Patent
Su et al.

(10) Patent No.: US 11,849,748 B2
(45) Date of Patent: *Dec. 26, 2023

(54) COOKING APPLIANCE AND METHOD FOR STARCH-BASED FOODSTUFFS

(71) Applicant: KONINKLIJKE PHILIPS N.V., Eindhoven (NL)

(72) Inventors: Guangming Su, Shanghai (CN); Weihua Lu, Shanghai (CN); Xiao Yun Kui, Shanghai (CN)

(73) Assignee: VERSUNI HOLDING B.V., Eindhoven (NL)

(*) Notice: Subject to any disclaimer, the term of this patent is extended or adjusted under 35 U.S.C. 154(b) by 51 days.

This patent is subject to a terminal disclaimer.

(21) Appl. No.: 17/284,811

(22) PCT Filed: Nov. 8, 2019

(86) PCT No.: PCT/EP2019/080700
§ 371 (c)(1),
(2) Date: Apr. 13, 2021

(87) PCT Pub. No.: WO2020/099266
PCT Pub. Date: May 22, 2020

(65) Prior Publication Data
US 2021/0337837 A1    Nov. 4, 2021

(30) Foreign Application Priority Data
Nov. 16, 2018  (WO) ................ PCT/CN2018/115996
Mar. 11, 2019  (EP) ..................................... 19161846

(51) Int. Cl.
*A23L 5/10*     (2016.01)
*A23L 19/18*    (2016.01)
(Continued)

(52) U.S. Cl.
CPC ................. *A23L 5/17* (2016.08); *A23L 19/18* (2016.08); *A47J 36/32* (2013.01); *A47J 37/0641* (2013.01); *A23V 2002/00* (2013.01)

(58) Field of Classification Search
CPC ....... A47J 36/32; A47J 37/0641; H05B 6/687; H05B 6/647; H05B 6/6435; H05B 1/0263
(Continued)

(56) References Cited

U.S. PATENT DOCUMENTS 4,390,768 A * 6/1983 Teich ................... H05B 6/6452
                                                          177/144
8,182,852 B2   5/2012 Loehn
(Continued)

FOREIGN PATENT DOCUMENTS

CN    108209533    6/2018
DE    1417484     10/1968
(Continued)

OTHER PUBLICATIONS

International Search Report and Written Opinion dated Feb. 12, 2020 for International Application No. PCT/EP2019/080700 Filed Nov. 8, 2019.

*Primary Examiner* — Phuong T Nguyen
(74) *Attorney, Agent, or Firm* — Maschoff Brennan

(57) ABSTRACT

The present disclosure relates to a device for cooking a starch-based food item. The device comprises a vessel for receiving a quantity of the starch-based food item with an initial weight; a weighing scale for weighting the food item during cooking; a heater for heating the starch-based food item; and a controller coupled to the weighing scale and the heater. The controller causes the heater to cook the starch-based food item at a first temperature for a first time duration, the first temperature is higher than a starch gelatinization temperature; and causes the heater, based on the weighing scale reading, to cook the starch-based food item (Continued)

at a second temperature for a second time, where the second temperature is higher than the first temperature and above 150° C. The device makes cooked food healthier and more appetizing, which is beneficial to health especially for individuals with diabetes and obesity.

10 Claims, 4 Drawing Sheets

(51) Int. Cl.
*A47J 36/32* (2006.01)
*A47J 37/06* (2006.01)

(58) Field of Classification Search
USPC ......... 99/325, 331, 334, 342, 404, 407, 408, 99/468; 219/391, 395, 396, 406, 408, 219/678, 700; 426/102, 302, 303, 443, 426/465, 466
See application file for complete search history.

(56) References Cited

U.S. PATENT DOCUMENTS

| | | | |
|---|---|---|---|
| 8,980,353 | B2 | 3/2015 | Ashourian et al. |
| 2014/0023774 | A1 | 1/2014 | Huber |
| 2017/0071393 | A1* | 3/2017 | Li .................. H05B 1/0258 |

FOREIGN PATENT DOCUMENTS

| | | |
|---|---|---|
| WO | 9622047 | 7/1996 |
| WO | 2017/178229 | 10/2017 |
| WO | 2018/149764 | 8/2018 |
| WO | 2019057980 | 3/2019 |

\* cited by examiner (a)
 (b)
 (c)
 (d)

COOKING APPLIANCE AND METHOD FOR STARCH-BASED FOODSTUFFS

CROSS REFERENCE TO RELATED APPLICATIONS

This application is the U.S. National Phase application under 35 U.S.C. § 371 of International Application No. PCT/EP2019/080700 filed Nov. 8, 2019, which claims the benefit of European Patent Application Number 19161846.1 filed Mar. 11, 2019 and Application Number PCT/CN2018/115996 filed Nov. 16, 2018. These applications are hereby incorporated by reference herein.

FIELD OF THE INVENTION

This invention relates to the cooking of starch-based foodstuffs, in particular potatoes.

BACKGROUND OF THE INVENTION

Nutrients are chemicals found in foods that are critical to human growth and functioning. There are six groups of essential nutrients: carbohydrates, lipids, proteins, vitamins, minerals and water. Carbohydrates together with lipids and proteins provide energy for the body, particularly for the brain and for physical exercise.

Starch food including rice, wheat, and potato is a staple food for almost all the people in the world and is the main source of carbohydrates. Our bodies easily digest most cooked starches, in which alpha bonds link the numerous glucose units together. Starch food, like rice, bread, pasta and potato are thus important for health and generally are eaten daily as a primary food source.

One of the concerns associated with the consumption of starch-based food is the high glycemic property and its relationship to diabetes. In particular, potato is regarded as "the second bread" for human consumption due to its high nutritional value, containing vitamin A, vitamin C, minerals and high quality starch.

Potatoes are often broadly classified as high on the glycemic index (GI) scale and so are often excluded from the diets of individuals trying to follow a low-GI diet. The GI of potatoes can vary considerably depending on the type, origin and cooking methods. Chips in particular have both high fat and high GI (for example higher than 70).

Starch can be classified into rapidly digestible starch (RDS), slowly digestible starch (SDS), and resistant starch (RS). The cause of the high GI is in particular the rapidly digestible starch (RDS). A reduction in RDS and an increase in SDS and/or RS are thus conducive to lowering the GI value. For a balanced healthy diet, a reduced intake of digestible food is desired to avoid over-intake of energy and reduce the risk of obesity or diabetes. Like dietary fiber, the resistant starch ("RS") is not digested. It is widely recognized that modern diets do not provide enough dietary fiber, which is an important component for gastrointestinal health. Reports have indicated that the average intake (13-15 g per day) is much lower than the recommended value (25 g and 38 g per day for women and men, respectively).

Cooking starch-based food normally makes the starch fully gelatinized which can be quickly digested and absorbed. This then increases the blood glucose level and insulin response after consumption. The quick increase in blood glucose may promote metabolic diseases such as obesity and diabetes.

In the food industry, complex physical and chemical procedures are used to generate resistant starch, which requires professional processing methods such as high pressure and long processing times. Some methods also involve using various harmful chemical reagents and elements. Pre-treatment methods are known for reducing oil content of French fries, such as soaking with salt solution before frying, or adopting new cooking methods like air frying.

US 2014/0023774 discloses a method for providing enhanced resistant starch based on a low temperature treatment before cooking. A reduction in water content is discussed, for example to below 35%, but it is not clear how the water content measurement may be implemented, particularly in a domestic cooking appliance. To reach a water content below the suggested 35% using a low temperature treatment stage would also take a substantial length of time.

There remains a need for a method to reduce the rapidly digestible starch, RDS, that at the same time enables obtaining an appetizing food product for normal consumers using home kitchen appliances.

SUMMARY OF THE INVENTION

The invention is defined by the claims.

According to one aspect of the disclosure, there is provided a device for cooking a starch-based food item. The device comprises: a vessel for receiving a quantity of the starch-based food item with an initial weight; a weighing scale for weighing the food item during cooking; a heater for heating the starch-based food item; and a controller coupled to the weighing scale and the heater, and configured to: cause the heater to cook the starch-based food item at a first temperature for a first time duration, wherein the first temperature is higher than a starch gelatinization temperature; and to cause the heater, in response to the determination that, based on the weighing scale reading, the weight of the starch-based food item drops by a first amount in a first range, to cook the starch-based food item at a second temperature for a second time duration sufficient for the weight of the starch-based food item to drop by a second amount, such that a total drop of the first and second amounts relative to the initial weight is within a second range, wherein the second temperature is higher than the first temperature and above 150° C.

This cooking process therefore provides a two-stage cooking procedure, which enables not only to reduce the rapidly digestible starch, RDS, as compared to a conventional cooking procedure, but also to achieve a more appetizing final food product. In other words, this cooking process can achieve a good balance between the reduction of rapidly digestible starch and the tasting quality. Further, the device measures the weight of the food during cooking to control the cooking times and thus enables a fully automated cooking process to be carried out by the device. It is thus suitable for implementation as a (low cost) kitchen appliance.

In some embodiments, the first temperature is in the range from 80° C. to 140° C.; and the second temperature is in the range from 150° C. to 180° C. Generally, the starch gelatinization temperature is between 60° C. and 80° C., depending on different food stuffs and/or food conditions. The first temperature above 80° C. ensures a temperature higher than the starch gelatinization temperature and thus can at least partially gelatinize the food items to be cooked; while the second temperature above 150° C. ensures a high temperature for the food items, which temperature is sufficient to result in a browning/golden appearance of the food items.

Further, the second temperature below 180° C. can prevent the possible formation of hazard compounds (e.g., acrylamide).

In some embodiments, the first temperature is in the range from 100 to 120° C.; and the second temperature is in the range from 160° C. to 170° C. The ranges selected here for the first temperature and the second temperature are preferred ranges, which can achieve a good balance between the reduction of rapidly digestible starch and the tasting quality.

In some embodiments, the first amount is in the range from 35% to 60%; and the total drop is in the range from 55% to 75%. These ranges provide a desired overall water content reduction and a desired degree of gelatinization corresponding to a desired property of the cooked food item.

In some embodiments, the first amount is in the range from 40% to 55%; and the total drop is in the range from 60% to 70%. These ranges can be more advantageous to achieve a desired overall water content reduction and a desired degree of gelatinization.

In some embodiments, the controller comprises a user interface unit for receiving an indication that the food item is fresh potatoes or frozen potatoes. With the user interface unit, food conditions, such as frozen or fresh, can be input in the device and hence are known to the controller. Also other cooking parameters such as stickiness, time duration can be input via the user interface unit.

In some embodiments, if the food item is indicated as a frozen food item via the user interface unit, the first amount is in the range from 40% to 60% and the total drop is in the range from 60% to 75%. In some embodiments, if the food item is indicated as fresh potatoes, the first amount is in the range from 35% to 55% and the total drop is in the range from 55% to 70%. The difference in ranges between the frozen and fresh food items is due to the fact that the frozen food item might have a higher water content.

In some embodiments, the device may be a home appliance, such as an air fryer. The air fryer is a device which uses circulating hot air in the cooking chamber, and it enables a low fat cooking process. Thus, the fat content as well as the rapidly digestible starch content can be reduced compared to conventional frying approaches, to provide a more healthy cooking process, particularly for potatoes.

According to another aspect of the disclosure, there is provided a method for cooking a starch-based food item. The method comprises: the use of a heater to cook the starch-based food item with an initial weight at a first temperature for a first time duration, wherein the first temperature is higher than a starch gelatinization temperature; monitoring the weight of the starch-based food item during cooking; determining whether the weight of the starch-based food item drops by a first amount in a first range; and in response to the determination that the weight of the starch-based food item has dropped by a first amount in a first range, using the heater to cook the starch-based food item at a second temperature for a second time duration sufficient for the weight of the starch-based food item to drop by a second amount, such that a total drop of the first and second amounts relative to the initial weight is within a second range, wherein the second temperature is higher than the first temperature and above 150° C.

According to yet another aspect of the disclosure, there is provided a computer readable medium on which a computer program may be stored. The computer program comprises code means adapted, when executed by a processor, to implement the method as described above.

BRIEF DESCRIPTION OF THE DRAWINGS

In the drawings, similar/same reference signs throughout different views generally represent similar/same parts. Drawings are not necessarily to scale. Rather, emphasis is placed on the illustration of the principles of the present invention. In these drawings.

DETAILED DESCRIPTION OF THE EMBODIMENTS

Embodiments of the present disclosure will be described in more detail with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are only for exemplary purposes, rather than being used to restrict the protection scope of the present disclosure.

In the descriptions of the embodiments of the present disclosure, the term "includes" and its variants are to be read as open-ended terms that mean "includes, but is not limited to." The term "based on" is to be read as "based at least in part on." The terms "one embodiment" and "this embodiment" are to be read as "at least one embodiment." The following text also can comprise other explicit and implicit definitions.

The present disclosure provides a device for cooking a starch-based food item, in which there is a first cooking stage at a first temperature higher than the gelatinization temperature and a second cooking stage at a second temperature higher than the first temperature. The first cooking stage provides a relative weight drop by a first amount and the second cooking stage provides a further relative weight drop. The weight is monitored during the first and second cooking stages to provide feedback control of the duration of the cooking times. With the device and method of the present disclosure, not only the rapid digestible starch (RDS) can be reduced, but also the appearance and tasting quality can be improved. In this way, the glycemic index (GI) of a food item is reduced, which is beneficial to health especially for individuals with diabetes and obese individuals, while additionally the prepared food product is more appetizing.

Figure 1:
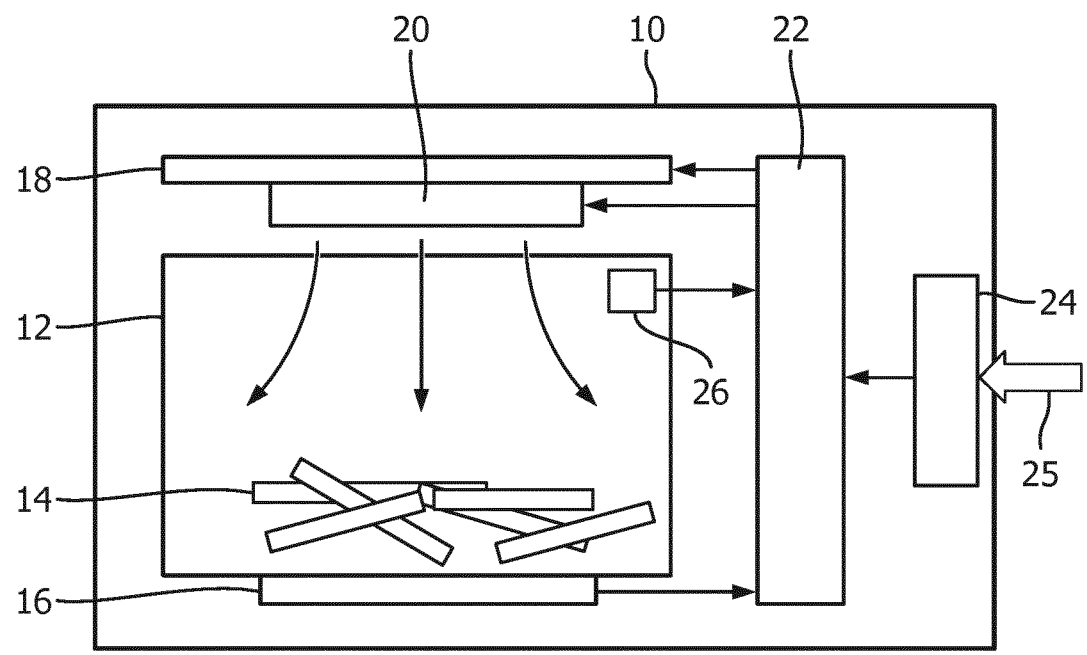
FIG. 1 illustrates a schematic diagram of an exemplary cooking device according to one embodiment of the present disclosure.

FIG. 1 illustrates a schematic diagram of an exemplary cooking device according to one embodiment of the present disclosure.

As shown in FIG. 1, the cooking device 10 comprises a vessel 12 for receiving a quantity of a starch-based food item. In some embodiments, the starch-based food item to be cooked can for example be potato sticks 14, which may be substantially of the same size.

A weighing scale 16 is arranged beneath the vessel 12 for weighing the potato sticks 14 during cooking. A heater 18 is used for heating the vessel contents. In some embodiments, the device 10 is an air fryer having a fan 20 for circulating hot air around the vessel 12.

The weighing scale 16 further provides its output to a controller 22, which controls the temperature and timing of operation of the heater 18. A user interface unit 24 receives a user's input 25 for controlling the cooking procedure and for setting user preferences, which may include temperatures, time delays and any other conventional cooker control parameters. A temperature sensor 26 is arranged within the vessel 12, so as to detect or monitor the cooking temperature. The detected cooking temperature signal is then transmitted to the controller 22 for temperature regulation.

In order to obtain a healthier and more appetizing end food product, the controller 22 is configured to:
cause the heater 18 to cook the starch-based food item 14 with an initial weight at a first temperature for a first time duration, wherein the first temperature is higher than a starch gelatinization temperature; and
to cause the heater 18, in response to the determination that, based on the weighing scale 16 reading, the weight of the starch-based food item drops by a first amount in a first range, to cook the starch-based food item 14 at a second temperature for a second time duration until the weight of the starch-based food item drops by a second amount, such that the combined drop of the first amount and the second amount relative to the initial weight is within a second range, wherein the second temperature is higher than the first temperature and above 150° C.

Therefore, the above cooking procedure comprises two cooking stages, i.e., a first cooking stage at a first temperature higher than the gelatinization temperature and a second cooking stage at a second temperature higher than the first temperature and particularly above 150° C. Note: The first temperature and the second temperature are both cooking temperatures for the food item 14 and are detected within the vessel 12 e.g., by the temperature sensor 26 during cooking.

Due to the first temperature being higher than the gelatinization temperature, the first cooking stage is used to dehydrate and partially gelatinize the starch in the food item, while the second cooking stage is used to complete the gelatinization of the starch and obtain an appetizing appearance, such as a golden or browning color. The above two cooking stages combined contribute to a healthy and appetizing final food product.

Generally, the starch gelatinization temperature of different food items is in the range from 60° C. to 80° C., and may vary depending on different food items and/or food conditions (e.g., frozen or fresh). In some embodiments, the starch gelatinization temperature of different food items can be predetermined and stored in the memory (not shown in FIG. 1) of the device 10. In some embodiments, values of the starch gelatinization temperature of different food items can be printed in a product description, which can be provided to a user along with the device. Consequently, when the starch gelatinization temperature of the food item to be cooked is known, the first temperature can be chosen or determined by the controller or the user.

In some embodiments, the first temperature may be in the range from 80° C. to 140° C., especially from 100° C. to 120° C., and the first amount may be in the range from 35% to 60%, especially from 40% to 55%.

The first amount can vary based on different food conditions. For example, for frozen food items, the first amount can be in the range from 35% to 60%, especially from 40% to 60%; while for fresh food items, the first amount can be in in the range from 35% to 60%, especially from 35% to 55%. The difference between the first amount of frozen and fresh food items is due to the fact that frozen food items may have a higher water content.

With the above selected ranges for the first temperature and the first amount, the food item may be gelatinized and dehydrated to some extent, e.g., 30%, 40%, 50%, 60%, or even 70% relative to an initial water content, which may contribute subsequently to a large reduction of the rapidly digestible starch (RDS).

The second cooking stage will further gelatinize the starch in the food item, and aims to attain an appetizing appearance (e.g., browning or golden color) and/or a good-tasting quality, e.g., crispy crust.

In this cooking stage, the second temperature will be chosen above 150° C. and higher than the first temperature, but particularly lower than a predetermined temperature at which hazardous compounds (e.g., acrylamide) might be formed.

For example, in some embodiments, the second temperature can be in the range from 150° C. to 180° C., especially from 160° C. to 170° C., and the total drop in weight may be in the range from 55% to 75%, especially from 60% to 70%. A higher temperature than 180° C. might possibly result in the formation of hazardous compounds (e.g., acrylamide) and thus is not preferred.

The total drop in weight can also vary based on different food conditions. For example, for frozen food items, the total drop can be in the range from 55% to 75%, especially from 60% to 75%; while for fresh food items, the total drop can be in the range from 55% to 75%, especially from 55% to 70%.

With the above selected range for the second temperature and the total drop in weight, the increase of the rapidly digestible starch (RDS) can be controlled, and an appetizing color and/or good taste for the final food products can be obtained.

The cooking procedure has been described in detail above and may be programmed and stored in the memory of the device 10. According to this cooking procedure, the controller 22 may select or adjust an appropriate cooking procedure based on different food conditions and/or user preferences. For example, food conditions may include, but are not limited to: freshness and degree of frozenness. User preferences may include, but are not limited to: doneness, stickiness, cooking temperature and cooking duration for the two cooking stages.

The user may input the cooking parameters (e.g., food condition or user preferences) of the food item via the user interface unit 24. In response to receiving the cooking parameters, the controller 22 may select/adjust the cooking procedure based on the indicated cooking parameters (e.g., fresh or frozen, doneness or stickiness).

With the input of the cooking parameters, the selection of the desired cooking procedure by the controller 22 may be simplified. However, in some embodiments, some of the user's indications/inputs might not be necessary. For example, instead of receiving input indicative of food conditions from the user, the device may comprise a sensor for sensing the food conditions of the food item and reporting them to the controller 22, which in turn may select or adjust the cooking procedure based on the sensed food conditions. In this case, the user operation can be simplified.

A number of experiments have been conducted to demonstrate the cooking effect of the cooking procedure according to the present disclosure. The following description relates to the steps of making French fries according to different cooking procedures.

1) Preparation of fresh potato sticks: clean the potatoes and cut them into long sticks with 10 mm (height)*10 mm (width) by means of a cutter. Soak the fresh potato sticks in water (?) of 40° C. for 30 min. Drain the potato sticks and absorb the residual water with kitchen paper.

2) Air frying the fresh potato sticks. The fresh potato sticks will be air fried according to 3 different cooking procedures within the same air fryer. Before each cooking procedure, the air fryer will be pre-heated at a predetermined temperature for 10 min to ensure uniform frying.

Sample 1: weigh 350 g prepared fresh fries, put them in the cooking chamber (pre-heated at 100° C.), run the frying program: a) in a drying stage, 100° C. for 30 min (weight loss 52.5%), and then b) in a cooking stage, 160° C. for 5 min (final weight loss 66.2%).

Sample 2: weigh 350 g prepared fresh fries, put them in the cooking chamber (pre-heated at 100° C.), run the frying program: a) in a drying stage, 100° C. for 20 min (weight loss 40.1%), and then b) in a cooking stage, 160° C. for 10 min (final weight loss 67.5%).

Contrasting sample: weigh 350 g prepared fresh fries, put them in the cooking chamber (pre-heated at 160° C.), run the frying program: 160° C. for 15 min (weight loss 53.8%).

Note: Sample 1 and 2 are prepared according to the cooking procedure of the present disclosure; while the Contrasting sample is prepared according to a conventional cooking procedure described in the product specification of a conventional air fryer.

3) After frying, take the fried fries out of the cooking vessel, and allow them to cool in the room environment for 5 min before RDS determination.

Figure 2:
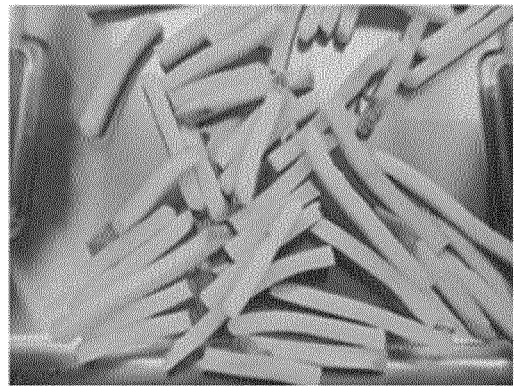
FIG. 2 shows different appearances of French fries prepared using different cooking procedures.
Figure 2:
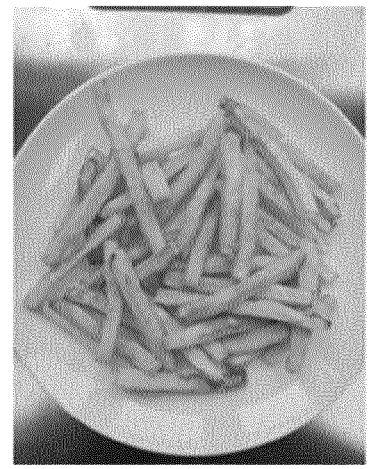
Figure 2:
Figure 2:

FIG. 2 shows different appearances of French fries in different stages according to three different cooking procedures, wherein (a) shows the fresh potato sticks before air frying, (b) shows the appearance of Sample 1, (c) shows the appearance of Sample 2, and (d) shows the appearance of the Contrasting sample.

As shown in FIG. 2, similar to the Contrasting sample, Sample 1 and Sample 2 show an appetizing golden color. Experiments also show that the tasting quality of Sample 1 and Sample 2 is much the same as that of the Contrasting sample.

Figure 3:
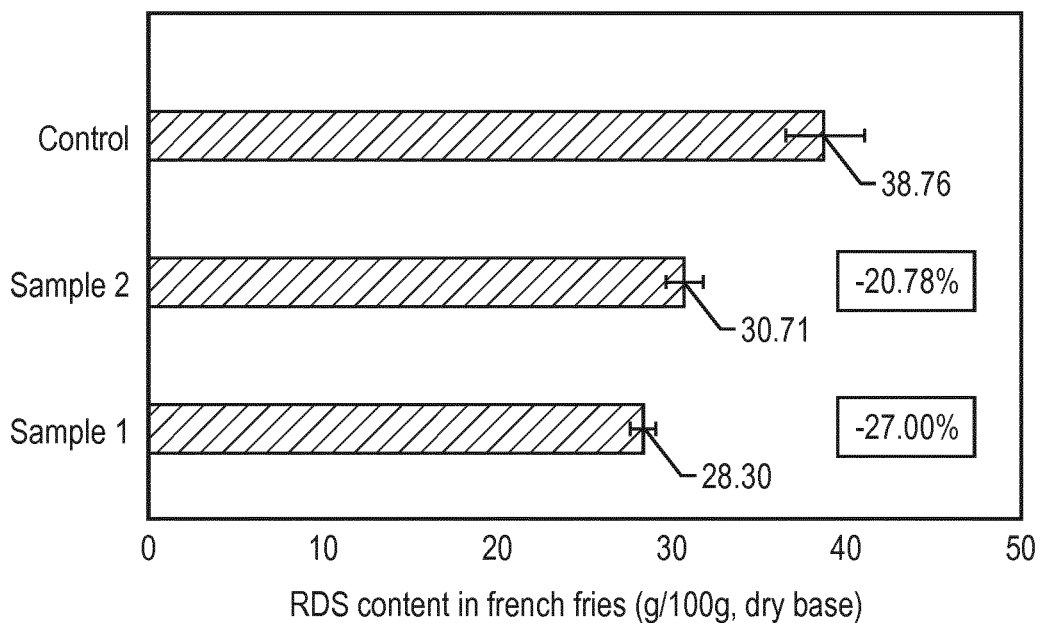
FIG. 3 shows different RDS contents in French fries prepared using different cooking procedures.

FIG. 3 shows different RDS contents in French fries prepared by different cooking procedures.

As shown in FIG. 3, the RDS contents in both Sample 1 and Sample 2 are significantly lower than that in the Contrasting sample, which indicates that the cooking procedure of the present disclosure can significantly reduce the RDS content in the final food product, as compared to that of the Contrasting sample. Therefore, a healthier and more appetizing food product can be prepared.

Further, by a comparison between Sample 1 and Sample 2, it can also be found that higher weight loss in the first cooking stage can result in a much lower content of RDS in the final food product. This result may be due to the fact that temperature and water content can influence the starch gelatinization. If, at the same cooking temperature, starch with a lower water content is not easy to gelatinize, then a lower RDS concentration in the final product is obtained.

Figure 4:
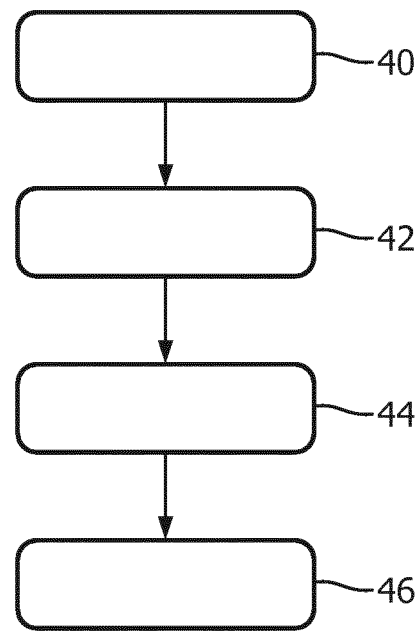
FIG. 4 illustrates a flowchart of a cooking method according to one embodiment of the present disclosure.

FIG. 4 illustrates a flowchart of a cooking method according to one embodiment of the present disclosure.

At block 40, a heater 18 is used to cook the starch-based food item with an initial weight at a first temperature for a first time duration, wherein the first temperature is higher than a starch gelatinization temperature.

In some embodiments, the heater 18 can be controlled by a controller 22. The first temperature is chosen above the starch gelatinization temperature in order to dehydrate and partially gelatinize the starch in the food item. The dehydration and partial gelatinization of the starch may result in a much reduced content of the rapidly digestible starch (RDS).

At block 42, the weight of the starch-based food item during cooking is monitored. The monitoring can be realized by means of an electronic weighing scale 16 and carried out in real time during cooking. The monitoring result will then be sent to the controller for further temperature regulation.

At block 44, it is determined whether the weight of the starch-based food item drops by a first amount in a first range. In some embodiments, this is realized by a controller, which calculates the weight loss of the starch-based food item in real time during cooking and then determines whether the weight loss is within a first range. In this event, the first time duration is dependent on the weight loss of the starch-based food item.

The first range may be from 35% to 60%, especially from 40% to 55%. Also, the first range can vary depending on different food conditions and/or different food stuffs.

At block 46, in response to the determination that the weight of the starch-based food item drops by a first amount in a first range, the heater 18 is used to cook the starch-based food item at a second temperature for a second time duration sufficient for the weight of the starch-based food item to drop by a second amount, such that a total drop of the first and second amounts relative to the initial weight is within a second range, wherein the second temperature is higher than the first temperature and above 150° C.

In some embodiments, the second temperature can be in the range from 150° C. to 180° C., especially from 160° C. to 170° C. Temperatures higher than 180° C. might result in the possible formation of hazardous compounds (e.g., acrylamide) and thus are generally not selected. The second temperature, higher than the first temperature, is used to complete the gelatinization of the starch and obtain an appetizing appearance, such as a golden or browning color.

The combined total drop in weight may be in the range from 55% to 75%, especially from 60% to 70%, which can vary depending on different food stuffs and/or different food conditions.

Therefore, the cooking method of the present disclosure provides a two-stage cooking method, in which there is a first cooking stage at a first temperature higher than the gelatinization temperature and a second cooking stage at a second temperature higher than the first temperature. The first cooking stage provides a relative weight drop by a first amount and the second cooking stage provides a further relative weight drop. The weight drop of the starch-based food item will be monitored and controlled. Due to the control of the first and second temperature and the weight loss of the starch-based food item, a healthy and appetizing final food product can be obtained.

Figure 5:
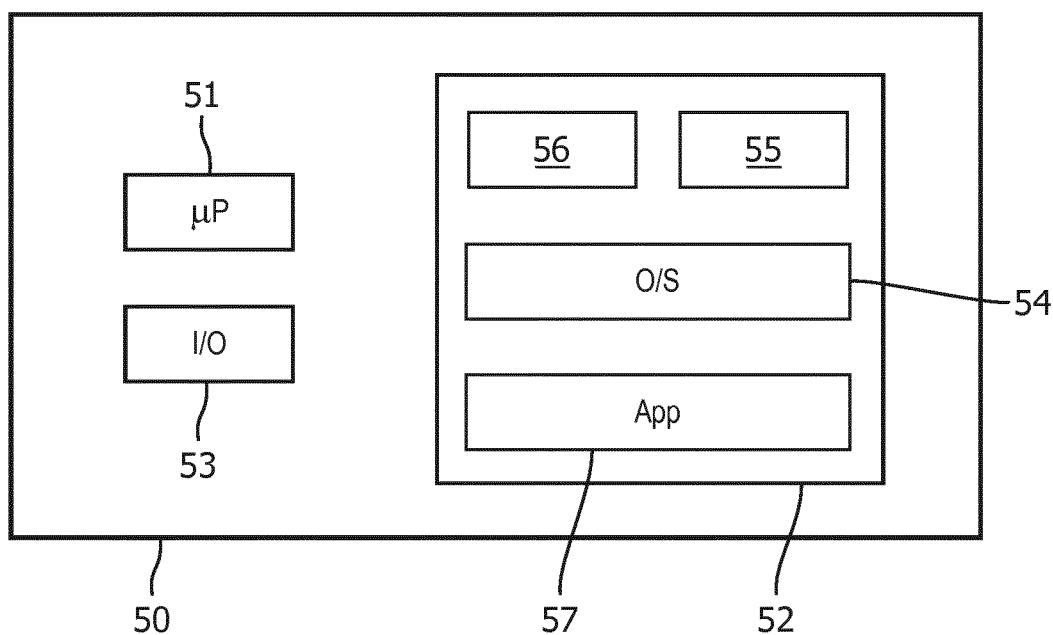
FIG. 5 illustrates an example of a computer for implementing the controller or processor used in the device.

FIG. 5 illustrates an example of a computer for implementing the controller or processor used in the device.

The computer 50 includes, but is not limited to, PCs, workstations, laptops, PDAs, palm devices, servers, storages, and the like. Generally, in terms of hardware architecture, the computer 50 may include one or more processors 51, memory 52, and one or more I/O devices 53 that are communicatively coupled via a local interface (not shown). The local interface can be, for example, but is not limited to, one or more buses or other wired or wireless connections, as are known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 51 is a hardware device for executing software that can be stored in the memory 52. The processor 51 can be virtually any custom-made or commercially available processor, a central processing unit (CPU), a digital signal processor (DSP), or an auxiliary processor among several processors associated with the computer 50, and the processor 51 may be a semiconductor-based microprocessor (in the form of a microchip) or a microprocessor.

The memory 52 can include any one or a combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 52 may incorporate electronic, magnetic, optical, and/or other types of storage media. Note that the memory 52 can have a distributed architecture, where various components are situated remote from one another, but can be accessed by the processor 51.

The software in the memory 52 may include one or more separate programs, each of which comprises an ordered listing of executable instructions for implementing logical functions. The software in the memory 52 includes a suitable operating system (O/S) 54, compiler 55, source code 56, and one or more applications 57 in accordance with exemplary embodiments.

The application 57 comprises numerous functional components such as computational units, logic, functional units, processes, operations, virtual entities, and/or modules.

The operating system 54 controls the execution of computer programs, and provides scheduling, input-output control, file and data management, memory management, and communication control and related services.

Application 57 may be a source program, executable program (object code), script, or any other entity comprising a set of instructions to be performed. When it is a source program, then the program is usually translated via a compiler (such as the compiler 55), assembler, interpreter, or the like, which may or may not be included within the memory 52, so as to operate properly in connection with the operating system 54. Furthermore, the application 57 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 53 may include input devices such as, for example but not limited to, a mouse, keyboard, scanner, microphone, camera, etc. Furthermore, the I/O devices 53 may also include output devices, for example but not limited to, a printer, display, etc. Finally, the I/O devices 53 may further include devices that communicate with (?) both inputs and outputs, for instance but not limited to, a network interface controller (NIC) or modulator/demodulator (for accessing remote devices, other files, devices, systems, or a network), a radio frequency (RF) or other transceiver, a telephonic interface, a bridge, a router, etc. The I/O devices 53 also include components for communicating over various networks, such as the Internet or intranet.

When the computer 50 is in operation, the processor 51 is configured to execute software stored within the memory 52, to communicate data to and from the memory 52, and to generally control operations of the computer 50 pursuant to the software. The application 57 and the operating system 54 are read, in whole or in part, by the processor 51, perhaps buffered within the processor 51, and then executed.

When the application 57 is implemented in software it should be noted that the application 57 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The invention is of primary interest for cooking potatoes. Of course, the cooking procedure may just be one cooking mode of an air fryer. Another cooking mode may be the conventional single-stage heating process. However, the single stage heating process may again be controlled using weight feedback (again with the aim of reaching a specific water content) rather than simply having a fixed duration. Fixed time duration cooking procedures may also be provided.

The device may have many different (and conventional) modes for different food items. The two-stage invention is not limited to potatoes, and may be applied to other starch based food items such as sweet potato, taro and cassava.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A device for cooking a starch-based food item, comprising:
 a vessel for receiving a quantity of the starch-based food item with an initial weight;
 a weighing scale for weighing the starch-based food item during cooking;
 a heater for heating the starch-based food item; and
 a controller coupled to the weighing scale and the heater, and configured to:
  cause the heater to cook the starch-based food item at a first temperature for a first time duration, wherein the first temperature is higher than a starch gelatinization temperature; and
  cause the heater, in response to a determination that, based on a weighing scale reading, a weight of the starch-based food item drops by a first amount in a first range, to cook the starch-based food item at a second temperature for a second time duration sufficient for the weight of the starch-based food item to drop by a second amount, such that a combined drop of the first amount and the second amount relative to the initial weight is within a second range, wherein the second temperature is higher than the first temperature and above 150° C.

2. The device of claim 1, wherein the first temperature is in a range from 80° C. to 140° C., and wherein the second temperature is in a range from 150° C. to 180° C.

3. The device of claim 2, wherein the first temperature is in a range from 100° C. to 120° C., and wherein the second temperature is in a range from 160° C. to 170° C.

4. The device of claim 1, wherein the first amount is in a range from 35% to 60%, and wherein the combined drop is in a range from 55% to 75%.

5. The device of claim 1, wherein the first amount is in a range from 40% to 55%, and wherein the combined drop is in the range from 60% to 70%.

6. The device of claim 5, wherein, if the starch-based food item is indicated as fresh potatoes, the first amount is in a range from 35% to 55%, and the combined drop is in a range from 55% to 70%.

7. The device of claim 1, further comprising a user interface unit to receive an indication that the starch-based food item is fresh potatoes or frozen potatoes.

8. The device of claim 7, wherein, if the starch-based food item is indicated as frozen food item, the first amount is in a range from 40% to 60%, and the combined drop is in a range from 60% to 75%.

9. The device of claim 1, wherein the device is an air fryer.

10. A computer readable medium having a computer program stored thereon which is executable by the controller of claim 1, to cook the starch-based food item of claim 1.

\* \* \* \* \*